United States Patent [19]

Jesseman

[11] Patent Number: 4,473,716
[45] Date of Patent: Sep. 25, 1984

[54] COMPACTED FINE WIRE CABLE AND METHOD FOR PRODUCING SAME

[75] Inventor: Wendell W. Jesseman, Lisbon, N.H.

[73] Assignee: New England Electric Wire Corporation, Lisbon, N.J.

[21] Appl. No.: 320,496

[22] Filed: Nov. 12, 1981

[51] Int. Cl.³ .................. H01B 7/08; H01B 13/06
[52] U.S. Cl. ..................... 174/117 F; 29/469.5; 29/745; 29/825; 156/50; 174/34; 174/113 A; 428/376; 428/378; 428/397
[58] Field of Search ............ 29/469.5, 745, 825; 57/212, 213, 215, 216, 217, 233; 156/50; 174/34, 113 A, 117 F, 117 FF, 129 R, 129 S; 428/375, 376, 377, 378, 397

[56]            References Cited
       U.S. PATENT DOCUMENTS

| 201,477 | 3/1878 | Alberger | 156/50 |
| 1,943,086 | 1/1934 | McKnight | |
| 3,226,278 | 12/1965 | Scofield et al. | 156/497 |
| 3,435,401 | 3/1969 | Epstein | 338/214 |
| 3,627,903 | 12/1971 | Plummer | 174/72 A |
| 3,649,434 | 3/1972 | Mortenson | 156/176 X |
| 3,654,380 | 4/1972 | Tatum et al. | 174/47 |
| 3,659,038 | 4/1972 | Shealy | 174/129 R X |
| 3,733,428 | 5/1973 | Fry | 174/72 A |
| 3,735,022 | 5/1973 | Estep | 174/117 F |
| 3,828,120 | 8/1974 | Hansen | 174/117 FF |
| 4,012,577 | 3/1977 | Lang et al. | 174/27 |
| 4,079,192 | 3/1978 | Josse | 174/36 X |
| 4,227,041 | 10/1980 | Den et al. | 174/117 F |

OTHER PUBLICATIONS

"Sy-Bondeze/Ap-Bondeze" Product Brochure, Phelps Dodge Magnet Wire Corp.

Primary Examiner—Robert A. Dawson

[57]              ABSTRACT

The method of the invention enables the manufacture of flat, rectangular cable from fine-gauge, self-bondable magnet wire. The cable is capable of efficiently transmitting electrical currents at high frequencies.

7 Claims, 10 Drawing Figures

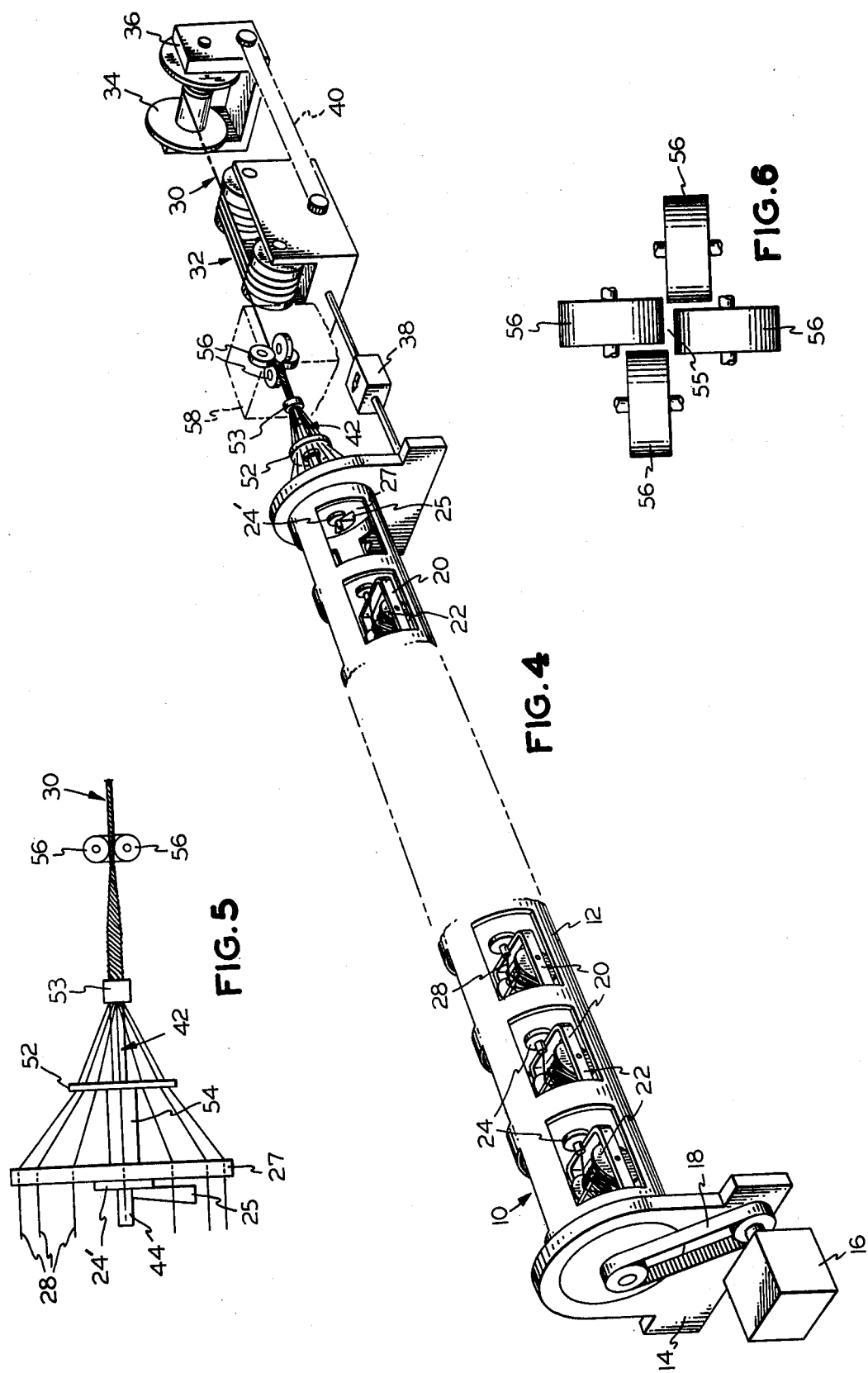

COMPACTED FINE WIRE CABLE AND METHOD FOR PRODUCING SAME

BACKGROUND OF THE INVENTION

To maximize conductor and turn density, the wire used in electrical inductors, transformers and the like may advantageously have a flat, rectangular cross-section, such as may be formed by compacting a cable (e.g., Litz cable) composed of a number of insulated conductors that have been helically wound together. The helical configuration of the conductors causes each to assume all positions within the cross-section of the cable, thus minimizing eddy current losses and skin effects that would otherwise be produced. A novel cable of this sort, having a thin strip of insulating sheet material interposed between the layers of which it is comprised, as well as a novel method and apparatus by which such cable can readily be produced, are described and claimed in copending application for U.S. Letters Pat. Ser. No. 235,706, entitled "Method of Producing Flat Stranded Magnetic Conductor Cable and Cable Produced Thereby" filed in the name of Robert Frank Meserve on Feb. 18, 1981, which application is of common assignment herewith.

While cable so constructed and configured is highly advantageous and in widespread use, difficulties arise when attempts are made to manufacture the cable utilizing magnet wire which is finer than about 30 AWG (American Wire Gauge units are used through the present specification), such as would be desirable if the cable were to be employed for the efficient transfer of electrical energy of relatively high frequency (i.e., above about 1,000 cycles per second, or one KHz). The difficulties arise primarily because of the flexibility and resiliency of the fine wires, which causes them to resist permanent deformation under the conditions of formation and compaction utilized in the cable manufacturing process. Thus, the relatively high tensile forces that are developed in drawing the conductors through the several stations of the converting machinery exert a straightening effect upon the individual strands, causing them all to seek centered positions and to thereby frustrate the forming and compacting operations. The fine wires also tend to break under the tension applied during forming, which of course reduces the efficiency of power transmission through the finished cable.

Accordingly, it is a primary object of the present invention to provide a novel and effective method by which a flat, rectangular cable can be produced from a multiplicity of relatively fine wire strands.

It is a more specific object of the invention to provide such a method by which the fine wires are integrated into a stiffened and mechanically strengthened assembly, enabling them to be formed into a physically stable configuration of high electrical continuity.

It is also an object of the invention to provide a novel cable so configured and comprised, which cable is capable of efficiently transmitting electrical energy of high frequency, and contains a minimum number of broken wires.

SUMMARY OF THE INVENTION

It has now been found that certain of the foregoing and related objects of the present invention are readily attained by a method for manufacturing cable, in which a multiplicity of strands of fine wire, each having a self-bondable coating thereon, are disposed in a bundle and subjected to conditions for integrating the coatings, so as to produce a conductor in which the strands are in relatively fixed positions within the coating matrix. A longitudinally advancing and rotating, generally circular array of at least four of such conductors is continuously supplied to a forming station at which the conductors are formed into a helical configuration of circular cross-section, which is gradually transformed to a flat elliptical configuration. The conductors are subsequently tightly compacted to transform the elliptical structure into a cable of generally rectangular cross-section, in which the conductors are densely packed and are disposed substantially in two layers. Finally, the cable so produced is continuously withdrawn from the forming station, the transforming, compacting and withdrawing steps being carried under applied tensile force.

In preferred embodiments of the method, the size of the wire utilized will be at least 30 AWG units, 0and generally it will be about 33–44 AWG units; each of the bundles utilized to produce the conductors will contain at least four, and more desirably at least seven, strands of wire. The self-bonding wire coating will most often be a thermoplastic resin that is solid at room temperature, with the integrating step being effected by heating the coating to at least the softening temperature of the resin, followed by cooling of the coating.

Other objects of the invention are attained by the provision of a cable produced in accordance with the foregoing method. Specifically defined, the article is a wound, flat rectangular cable comprised of a plurality of conductors, each conductor in turn being composed of a multiplicity of fine wire strands having a self-bondable coating thereon. The wires strands are disposed in a bundle, with the coatings thereon integrated to produce a conductor in which the strands are in relatively fixed positions within the matrix formed thereby, and the conductors are helically wound together and compacted to dispose them substantially in two layers within the cable.

In the preferred cable, each of the conductors will contain at least seven wires, and there will be at least eight such conductors. Typical constructions may utilize seven 33-gauge wires in a cable containing seventeen conductors, nineteen 36-gauge wires in a cable containing thirteen conductors, and ninety 36-gauge wires in a cable containing eight conductors. Generally, the wires will be made of copper, copper alloy, or aluminum and they will be tightly packed, preferably to provide less than about 15 percent of void space and dielectric substance, on a volumetric basis.

BRIEF DESCRIPTION OF THE DRAWINGS

FIG. 4 is a diagrammatical, fragmentary perspective view of a system suitable for carrying out the method, and for producing the cable, of the present invention;

FIG. 5 is a fragmentary elevational view of the forming station of the system of FIG. 4, drawn to an enlarged scale;

FIG. 6 is an end view of the turkshead roller die set utilized in the system of FIG. 4, drawn to a scale that is further enlarged from that of FIG. 5;

DETAILED DESCRIPTION OF THE PREFERRED AND ILLUSTRATED EMBODIMENT

Figure 3:
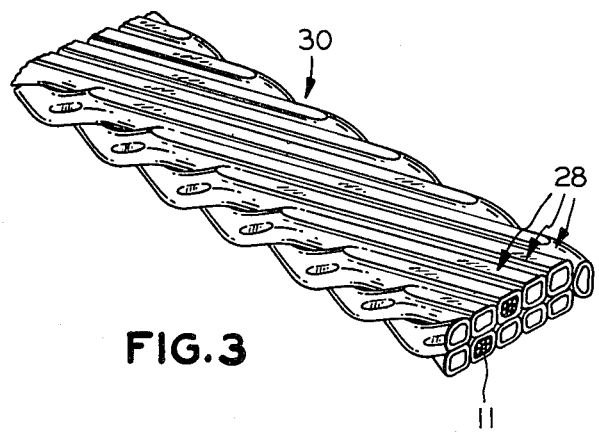
FIG. 3 is a fragmentary perspective view of a section of cable produced utilizing the conductor of FIG. 2 in the method of the invention.
Figure 1:
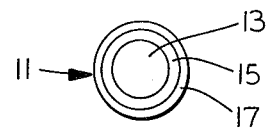
FIG. 1 is a cross-sectional view of a magnet wire suitable for use in producing the cable of the present invention.
Figure 2:
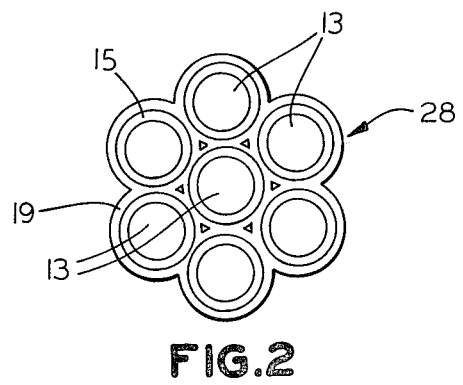
FIG. 2 is a cross-sectional view of a conductor comprised of seven strands of the wire of FIG. 1, the self-bonding coatings thereon being integrated to form a matrix for the wires.

Turning first to FIG. 1 of the drawings, a magnet wire suitable for use in the present invention, and generally designated by the numeral 11, is shown in cross-section, and consists of a metal core 13 having an insulating enamel base coat 15 and a top coat 17 of a self-bondable material thereon. In FIG. 2, seven of such wires 11 are concentrically stranded to form a conductor, generally designated by the numeral 28, with the self-bondable coatings thereon integrated to form an encapsulating matrix 19. FIG. 3 shows eleven of the conductors 28 wound, formed and compacted into a cable embodying the invention, which is generally designated by the numeral 30. Assuming the magnet wire 11 to be of 33 AWG size, the cable 30 would be designated a 11×7/33 cable (obviously, some of the component wires 11 of the conductors 28 are not shown in FIG. 3, for clarity of illustration).

Turning now to FIG. 4, the system illustrated includes a conventional tubular stranding machine, generally designated by the numeral 10, which is suitable for use in the method of the invention, to produce the product thereof. The machine 10 consists of a cylindrical body 12, which is journaled in end bearings 14 and is rotated by the motor 16 through the drive belt 18. Disposed within compartments spaced along the length of the body 12 are a number of cradles 20, each of which rotatably mounts a reel 22, which in turn holds a supply of the conductor 28; the cradles 20 are themselves supported by bearing assemblies 24, permitting them to remain stationary while the body 12 rotates about them. A stabilizing weight 25 is affixed to the bearing assembly 24' mounted in the end plate 27, and serves to maintain the rotationally fixed position of the core-pin, generally designated by the numeral 42. As is normally the case in machines of this sort, the conductor played off from each of the reels 22 passes into the associated bearing assembly 24 and then radially outwardly to the body 12. The body is provided with appropriately positioned guides (not shown) through which the individual conductors 28 pass to the forward end of the machine 10. There, they are combined and twisted into the cable 30 at a forming station of the system, which will be described in detail hereinbelow. FIG. 4 is, of course, a foreshortened view of the machine 10; in actuality, it will have compartments and cradles 20 sufficient to mount the number of supply reels 22 necessary to provide as many strands 28 of the conductor as may be desired in the ultimate cable 30.

The individual conductors 28 are drawn through the machine 10 and the forming station of the system by a haul-off capstan, generally designated by the numeral 32; the finished cable 30 is withdrawn therefrom and wound upon a take-up reel 34, journaled in a stand 36. Motivating force for the capstan 32 is taken from the machine motor 16 through a transmission, including an adjustable gear box 38. The take-up reel 34 is, in turn, driven from capstan 32 through the drive chain 40.

Figure 7:
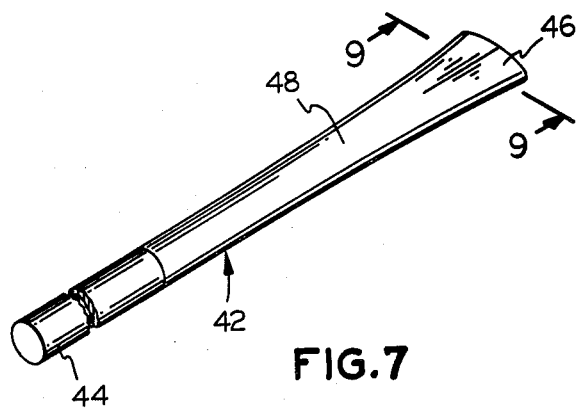
FIG. 7 is a perspective view of the core-pin or mandrel utilized in the system, drawn to a scale that is greatly enlarged from that of FIG. 1.

With particular reference to FIG. 7, the core-pin or mandrel 42, provided at the forming station, has a leading end portion 44 of circular cross-section, a trailing end portion 46 of flat, elliptical cross-section, and a gradual transition portion 48 therebetween. As is best seen in FIG. 5, a circular stranding plate 52 is rigidly attached to the machine end plate 27 by a tubular connector 54, through which passes the circular leading end portion 44 of the core-pin 42. Consequently, the stranding plate 52 and the end plate 27 (which is attached to the cylindrical body 12) rotate in tandem when the body 12 is rotated during operation of the machine 10. A stranding die 54 is supported (by means not shown) forwardly of the stranding plate 52, and has a passageway of circular cross-section providing, in cooperation with the core-pin 42, an annular space through which the conductors 28 pass. Thus, after passing through the end plate 27, the conductors are constrained in a circular array by the stranding plate 52, and are thereafter further constrained and transformed from a reduced diameter circular cross-section to one of flat, elliptical configuration. Because the array is moving rotationally as well as longitudinally at the point of engagement upon the core-pin 42, the conductors 28 are twisted upon one another into a helical configuration, which is preserved during transformation of the structure to the elliptical cross-sections. Since the cradles 22 do not rotate with the body 12 of the machine 10, no twisting of the individual conductors about their own axes occurs.

Figure 8:
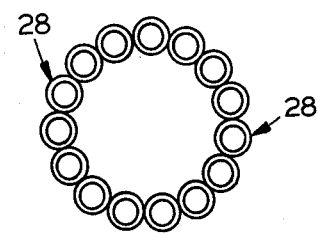
FIG. 8 is a cross-sectional view of the forming station of the system of FIG. 4, taken at the point of initial contact of the conductors upon the core-pin, but eliminating the core-pin for clarity of illustration.
Figure 9:
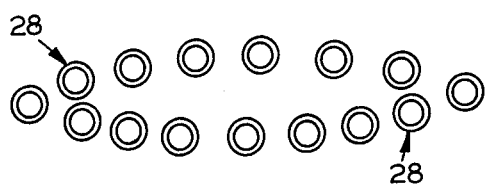
FIG. 9 is a cross-sectional view similar to that of FIG. 8 and drawn to the scale thereof, taken at about the location of line 9—9 of FIG. 7, and exaggerating the spacing between individual conductors, again for the sake of clarity.
Figure 10:
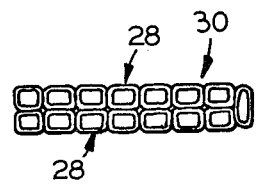
FIG. 10 is a cross-sectional view of cable embodying the invention.

At a downstream point directly adjacent the core-pin 42, the conductors 28, which are then disposed substantially in two layers, enter the rectangular nip 55 formed by the set of four turkshead rollers 56 (best seen in FIG. 6), which are rotatably supported by appropriate structure 58, shown diagrammatically in FIG. 4. The structure is thereby compacted to form the ultimate cable 30, shown in greatest detail in FIGS. 3 and 10. As can be seen, the individual strands 28 are twisted together into a helical configuration of flat, rectangular cross-section, with each disposed in all possible cross-sectional positions within the cable 30, thereby providing certain of the desirable electrical properties referred to hereinabove. As will be appreciated, individual wires are not shown in FIGS. 8–10, for clarity of illustration.

Self-bondable magnet wire of the sort that is employed to produce the conductors from which the present cable is fabricated is sold commercially by most magnet wire manufacturers. It is normally used in producing self-supporting structures from bundles of fine wires, such structures typically taking the form of television yoke coils, solenoid coils, and the like; the wire is also commonly used to wind motor parts, such as armatures and field coils. Such products are sold, for example, by the Phelps-Dodge Magnet Wire Corporation, of Fort Wayne, Indiana and Hopkinsville, Kentucky, under the trade designations SY-BONDEZE and AP-BONDEZE; similar products are also available from the American Wire Corporation, of Sandy Hook, Conn., (e.g., their PNB-1 wire product). The self-bondable wire is normally used by assemblying the desired number of strands, forming them into the ultimate configuration, and then effecting integration in an appropriate manner, which will depend upon the nature of the bondable coating. Normally, it will be achieved by either a heating method or a solvating method, the former being carried out by heating the free-standing coil or the wound part in an oven, or by passing a current through the wire to generate the necessary thermal energy; solvent activation is achieved by a dipping, spraying or wiping technique. As far is known, however, in no instance has the integrated wire structure per se been subjected to significant post-forming operations.

Commercial self-bondable magnet wire is available in a wide range of sizes, and with a variety of coatings thereon. Generally, the wire will have a duplex coating, consisting of a self-bondable surface layer, and an underlying base coat to provide necessary electrical, mechanical and chemical characteristics. The underlying insulation will normally be provided by a natural or synthetic organic dielectric resinous material of the sort that is conventionally used for wire coating purposes, exemplary of which are the polyesters, polyamides, the polyimides, the polyvinyl formal resins, conventional varnishes, etc.; copolymers and interpolymers, as well as multilayer composite coatings are also commonly used. As will be appreciated, the composition of the base coat applied to the wire is not critical to the invention and, indeed, for some applications it may be possible to dispense with the base coat entirely.

Similarly, the specific composition of the bondable coating provided on the wire is not critical, as long as it is capable of integration, under suitable conditions, to provide the levels of interbonding necessary to set the wires in fixed positions relative to one another. Thus, thermoplastic resins, partially cured or B-stage thermosetting resins, and other compositions can be used, as can a variety of activating mechanisms (e.g., cross-linking or further polymerization), in addition to those previously mentioned. With the foregoing in mind, it might be mentioned that one self-bondable magnet wire that has been employed to considerable advantage in the practice of the present invention is the above-mentioned SY-BONDEZE product which is believed to comprise a polyurethane-nylon base carrying a top coating of polyvinylbutyral. Such a coating can be activated by heating it to a temperature of at least about 105° to 150° Centigrade, or by subjecting it to the solvating effects of ethyl alcohol, isopropyl alcohol or acetone.

Normally, the thickness of enamel on each of the wires will be at least about one-quarter of a mil (one-half mil build on the diameter), and the self-bondable coating will be of about the same thickness for a 33 gauge wire, diminishing as the size of the wire decreases. It obviously goes without saying that the composition and thickness of the coatings on the wire must be such as will enable use in the forming and compaction operations to which the conductors are subjected, without failure or significant loss of continuity.

Insofar as the wire itself is concerned, generally it will be made of copper, although copper alloys and aluminum, and possibly other base metals, may be used to advantage. A wide range of wire sizes may be employed depending upon the intended applications for the cable produced; the concepts of the invention are, of course, particularly valuable in enabling the manufacture of cable that is to be used for the efficient transmission of high frequency electrical energy, utilizing the fine wires necessary for that purpose. The added rigidity and structural strength afforded by integrating the several wires of each conductor bundle, prior to subjecting them to the cable-forming operations, minimizes breakage and the tendency of the flexible, resilient fine wires to seek centered positions, under the tensile stresses applied. As a result very fine wires can be used to produce Litz-type cables, which will perform to full design efficiency.

The relationship that exists between efficient electrical transmission at high frequencies, and wire size, is well-established, and is based upon recognized principles. While precise correlations might be made, the following can be employed as a good generalization:

| Frequency Range (KHz) | AWG Wire Size |
|---|---|
| 10–20 | 33 |
| 20–50 | 36 |
| 50–100 | 38 |
| 100–200 | 40 |
| 200–350 | 42 |
| 350–850 | 44 |

A 30 AWG wire is quite flexible and resilient, and is efficiently utilized for the transmission of energy at frequencies above about one thousand Hertz (KHz); these represent, therefore, threshold values beyond which the concepts of the invention offer most substantial benefit, albeit that they become most pronounced when the wires are 33 AWG or finer. The number of individual strands of wire to be included in the ultimate cable depends primarily upon the current that the cable is intended to carry, taking into consideration, of course, the frequency factor. As a general rule, the cross-sectional area of the cable should have a value (in circular mils) that is 1,000 times the amperage rating. By dividing that product by the nominal cross-sectional area of the wire which is selected to accommodate the design frequency, the number of strands to be employed is indicated.

Typically, each conductor will contain from two to ninety wires, and the cable will contain from four to seventeen such conductors, specific examples being 17×7/33, 13×19/36 and 8×90/36 constructions, in which expressions the initial number represents the number of conductors in the cable, the second number represents the number of wires in each conductor, and the last number indicates the wire gauge size. Although there may, as indicated, be as few as two wires in each conductor, from a practical standpoint it will generally be preferable to use more. Certain numbers of wires (e.g., 7, 19 and 37) are conveniently run as a regular concentric strand, whereas other numbers are more readily run by merely twisting them together. Moreover, assembly can be effected in one or more operations; for example, to produce a conductor containing 90 strands, bunching can most readily be achieved in two stages, in which three bunches of 30 wire strands each are combined to produce each conductor.

The width and thickness of the ultimate cable will depend not only upon the number and size of individual wires present, but also upon the degree to which the composite is compacted. It will be appreciated that high levels of compaction and conductor packing will produce corresponding levels of metal density, generally with commensurate benefit. In the preferred embodiments, compaction will be effected to produce less than about 15 percent of void space and dielectric substance within the cable, and most desirably the value will be lower. While it is obviously not possible to achieve a metal density value of 100 percent, still the cable may undergo greater than 100 percent compaction, which simply means that it has become elongated.

By way of specific example of the products of the invention, a Type-8 Litz cable formed from 15 solid round copper wires of 24 AWG (0.0224 inch insulated diameter) will carry approximately six amperes of electric current at a frequency of 1,000 Hertz. Seventeen 7/33 AWG conductors (each of 0.0225 inch stranded diameter) formed into a flat, rectangular cable (i.e., a 17×7/33 structure) can, on the other hand, efficiently transmit the same current at frequencies as high as 20 KHz. Cables made with 36 AWG wire efficiently carry current at frequencies up to about 50 KHz, and it is believed that cable capable of transmitting 200 KHz and higher can be produced with yet finer wire, using the principles of the present invention.

Although the system shown in the drawings is appropriate for use in the manufacture of these cable, variations will undoubtedly occur to those skilled in the art, which can readily be used in the practice of the instant method without departure from the concepts of the invention. It will also be understood that the deformed configuration of the conductors in the cable is only suggested by the drawings, and that little effort has been made to accurately reproduce the actual ultimate condition of the composite elements after compaction.

Thus, it can be seen that the present invention provides a novel and effective method by which a flat, rectangular cable can be produced from a multiplicity of relatively fine wire strands. In accordance with it, the fine wires are integrated into a stiffened and mechanically strengthened assembly, enabling them to be formed into a physically stable configuration of high electrical continuity. The invention provides a novel cable so configured and comprised, which cable is capable of efficiently transmitting electrical energy of high frequency and contains a minimum number of broken wires.

Having thus described the invention, what is claimed is:

1. In a method for the manufacture of a flat, rectangular cable comprised of two layers of compacted, helically wound conductors, each of said conductors consisting of a multiplicity of wire strands, the steps comprising:
(a) disposing a multiplicity of strands of fine wire, of at least 30 AWG units, in a bundle, each of said wires having a self-bondable coating thereon;
(b) subjecting said bundle of wire strands to conditions for integrating the coatings thereon, to thereby produce a stiffened and mechanically strengthened conductor in which said strands are in relatively fixed positions within the coating matrix so formed;
(c) continuously supplying to a forming station a longitudinally advancing and rotating, generally circular array of at least four of said conductors, and forming said conductors into a helical configuration of circular cross-section;
(d) gradually transforming the cross-section of said array from circular to a flat elliptical configuration;
(e) tightly compacting said conductors to transform said elliptical structure into a cable of generally rectangular cross-section in which said conductors are densely packed and are disposed substantially in two layers; and
(f) continuously withdrawing the cable so produced from said forming station, said transforming, compacting and withdrawing steps being carried out under applied tension.

2. The method of claim 1 wherein said wire size is 33 to 44 AWG units, and wherein each of said bundles contains at least seven strands of said wire.

3. The method of claim 1 wherein said bondable coating comprises a theremoplastic resin that is solid at room temperature, and wherein said integrating step is effected by heating of said coating to at least the softening temperature of said resin, said coating thereafter being cooled to below said temperature to form said matrix.

4. A physically stable flat rectangular cable comprised of two layers of compacted, helically wound conductors, each conductor consisting of a multiplicity of wire strands, said cable being produced by the steps comprising:
a. disposing in a bundle a multiplicity of strands of fine wire of at least 30 AWG units, each of said wires having a self-bondable coating thereon;
b. subjecting said bundle of wire strands to conditions for integrating the coatings thereon, to thereby produce a stiffened and mechanically strengthened conductor in which said strands are in relatively fixed positions within the coating matrix so formed;
c. continuously supplying to a forming station a longitudinally advancing and rotating, generally circular array of at least four of said conductors, and forming said conductors into a helical configuration of circular cross-section;
d. gradually transforming the cross-section of said array from circular to a flat elliptical configuration;
e. tightly compacting said conductors to transform said elliptical structure into a cable of generally rectangular cross-section in which said conductors are densely packed and are disposed substantially in two layers; and
f. continuously withdrawing said cable so produced from said forming station, said transforming, compacting and withdrawing steps being carried out under applied tension.

5. The cable of claim 4 wherein said wire size is 33 to 44 AWG units, and wherein each of said bundles contains at least seven strands of said wire.

6. The cable of claim 5 comprised of at least eight of said conductors, said wires of said conductors having a core of copper, copper alloy or aluminum.

7. The cable of claim 5 wherein said conductors are compacted to provide less than about 15 percent of void space and dielectric substance, on a volumetric basis.

* * * * *